US009679412B2

United States Patent
Park et al.

(10) Patent No.: US 9,679,412 B2
(45) Date of Patent: Jun. 13, 2017

(54) 3D FACE MODEL RECONSTRUCTION APPARATUS AND METHOD

(71) Applicants: INTEL CORPORATION, Santa Clara, CA (US); Minje Park, Seongnam (KR); Olivier Duchenne, Seoul (KR); Yeongjae Cheon, Seoul (KR); Tae-Hoon Kim, Seoul (KR); Xiaolu Shen, Beijing (CN); Yangzhou Du, Beijing (CN); Wooju Ryu, Seoul (KR); Myung-Ho Ju, Seoul (KR)

(72) Inventors: Minje Park, Seongnam (KR); Olivier Duchenne, Seoul (KR); Yeongjae Cheon, Seoul (KR); Tae-Hoon Kim, Seoul (KR); Xiaolu Shen, Beijing (CN); Yangzhou Du, Beijing (CN); Wooju Ryu, Seoul (KR); Myung-Ho Ju, Seoul (KR)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 14/443,337

(22) PCT Filed: Jun. 20, 2014

(86) PCT No.: PCT/CN2014/080382
§ 371 (c)(1),
(2) Date: May 15, 2015

(87) PCT Pub. No.: WO2015/192369
PCT Pub. Date: Dec. 23, 2015

(65) Prior Publication Data
US 2016/0275721 A1 Sep. 22, 2016

(51) Int. Cl.
*G06K 9/00* (2006.01)
*G06T 17/20* (2006.01)

(52) U.S. Cl.
CPC ........ *G06T 17/205* (2013.01); *G06K 9/00214* (2013.01); *G06K 9/00221* (2013.01);
(Continued)

(58) Field of Classification Search
None
See application file for complete search history.

(56) References Cited

U.S. PATENT DOCUMENTS

| 9,111,134 | B1* | 8/2015 | Rogers ............... G06K 9/00302 |
| 2002/0067362 | A1* | 6/2002 | Agostino |
| | | | Nocera ............... G06K 9/00248 345/473 |

(Continued)

FOREIGN PATENT DOCUMENTS

| CN | 1607551 A | 4/2005 |
| CN | 103210332 A | 7/2013 |

(Continued)

OTHER PUBLICATIONS

Jebara, Tony S., and Alex Pentland. "Parametrized structure from motion for 3D adaptive feedback tracking of faces." Computer Vision and Pattern Recognition, 1997. Proceedings., 1997 IEEE Computer Society Conference on. IEEE, 1997.*

(Continued)

*Primary Examiner* — King Poon
*Assistant Examiner* — Vincent Peren
(74) *Attorney, Agent, or Firm* — Schwabe, Williamson & Wyatt, P.C.

(57) ABSTRACT

Apparatuses, methods and storage medium associated with 3D face model reconstruction are disclosed herein. In embodiments, an apparatus may include a facial landmark detector, a model fitter and a model tracker. The facial landmark detector may be configured to detect a plurality of landmarks of a face and their locations within each of a (Continued)

plurality of image frames. The model fitter may be configured to generate a 3D model of the face from a 3D model of a neutral face, in view of detected landmarks of the face and their locations within a first one of the plurality of image frames. The model tracker may be configured to maintain the 3D model to track the face in subsequent image frames, successively updating the 3D model in view of detected landmarks of the face and their locations within each of successive ones of the plurality of image frames. In embodiments, the facial landmark detector may include a face detector, an initial facial landmark detector, and one or more facial landmark detection linear regressors. Other embodiments may be described and/or claimed.

23 Claims, 7 Drawing Sheets

(52) U.S. Cl.
CPC ..... *G06K 9/00248* (2013.01); *G06K 9/00261* (2013.01); *G06T 17/20* (2013.01); *G06T 2200/04* (2013.01); *G06T 2207/30201* (2013.01)

(56) References Cited

U.S. PATENT DOCUMENTS

| | | | |
|---|---|---|---|
| 2002/0102010 A1* | 8/2002 | Liu | G06K 9/00248 382/107 |
| 2006/0188144 A1 | 8/2006 | Sasaki et al. | |
| 2013/0271451 A1* | 10/2013 | Tong | G06T 17/00 345/419 |
| 2014/0043329 A1* | 2/2014 | Wang | G06T 17/20 345/420 |
| 2014/0185924 A1* | 7/2014 | Cao | G06K 9/00248 382/159 |

FOREIGN PATENT DOCUMENTS

| | | |
|---|---|---|
| CN | 10359870 A | 2/2014 |
| WO | WO2012126135 A1 | 9/2012 |

OTHER PUBLICATIONS

International Search Report and Written Opinion mailed Feb. 26, 2015 for International Application No. PCT/CN2014/080382, 12 pages.

* cited by examiner

3D FACE MODEL RECONSTRUCTION APPARATUS AND METHOD

CROSS REFERENCE TO RELATED APPLICATIONS

The present application is a national phase entry under 35 U.S.C. §371 of International Application No. PCT/CN2014/080382, filed Jun. 20, 2014, entitled "3D FACE MODEL RECONSTRUCTION APPARATUS AND METHOD", which designated, among the various States, the United States of America. The Specification of the PCT/CN2014/080382 Application is hereby incorporated by reference.

TECHNICAL FIELD

The present disclosure relates to the field of data processing. More particularly, the present disclosure relates to three-dimensional (3D) face model reconstruction method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in computer vision, image processing and digital photography, making 3D models of human faces has attracted increasing interest from researchers and engineers, since 3D face mesh can be used as a basic tool for understanding facial shape, expression and head-pose. Further, 3D face models have more expandability than two dimensional (2D) face models, and enable developers/designers of applications to provide users with richer experiences, e.g., in visual communication and entertainment. However, making a 3D face model from a single image is not an easy task. Further, tracking expressions and head pose of the 3D mesh in a single video stream is an even more challenging problem. Prior art techniques typically require a complex registration step that may require 5-10 minutes, and they tend to be insufficiently robust for out-of-plane rotation. Further, prior art techniques tend to provide coverage for a limited to small sets of face shapes or expressions, and typically, the amount of computational resources required exceed or at least strain the capability of the more resource constrained devices, such as mobile devices like smartphones or computing tablets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with 3D face model reconstruction are disclosed herein. In embodiments, an apparatus may include a facial landmark detector, a model fitter and a model tracker, coupled with each other. The facial landmark detector may be configured to detect a plurality of landmarks of a face and their locations within each of a plurality of image frames. The model fitter may be coupled to the facial landmark detector and configured to generate or regenerate a 3D model of the face from a 3D model of a neutral face, in view of detected landmarks of the face and their locations within one of the plurality of image frames. The model tracker may be coupled to the facial landmark detector and the model fitter, and configured to adjust the 3D model generated by the model fitter to track the face in subsequent image frames. Model tracker may successively update the 3D model in view of detected landmarks of the face and their locations within each of successive ones of the plurality of image frames. In embodiments, the apparatus may further include a validator coupled with the model tracker and configured to monitor the face tracking for excessive drifting, and cause the model fitter to regenerate the 3D model when excessive drifting is detected.

In embodiments, the facial landmark detector may include a face detector, an initial facial landmark detector, and one or more facial landmark detection linear regressors, coupled with each other. The face detector may be configured to detect a face within an image frame, whereas the initial facial detector may be coupled with the face detector and configured to detect a number of facial landmarks, including an inner eye corner, and their locations within a detected face. The one or more facial landmark detection linear regressors may be coupled with the face detector and the initial facial detector and configured to iteratively refine the facial landmark locations with increased precision. In embodiments, the facial landmark detector may also include a validator to reconstruct a face from the facial landmarks, and an image frame, and provide the reconstructed image frame to the face and initial facial landmark detectors to detect whether a face and one or more eyes are present within the reconstructed image frame.

In embodiments, the model fitter maybe configured to generate or regenerate a 3D model of the face from the neutral face by determining a 3D mesh for the face, employing a point based facial landmark model, an ellipsoidal head model to estimate rigid motion of the face, and non-rigid deformable mesh model for facial shapes and expression. The model tracker may be similarly constituted as the model fitter, except the model tracker may be configured to maintain the 3D model of the face, through adjustment of the resulting 3D model of the face of the previous image frame.

Resultantly, these elements may enable 3D face model to be reconstructed for each image frame of a video stream more efficiently, requiring less computational resources, thus more suitable for resource constrained computing devices, such as mobile computing devices. Further, the reconstructed 3D face model may be more robust and able to track a wide range of facial expressions and head poses.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
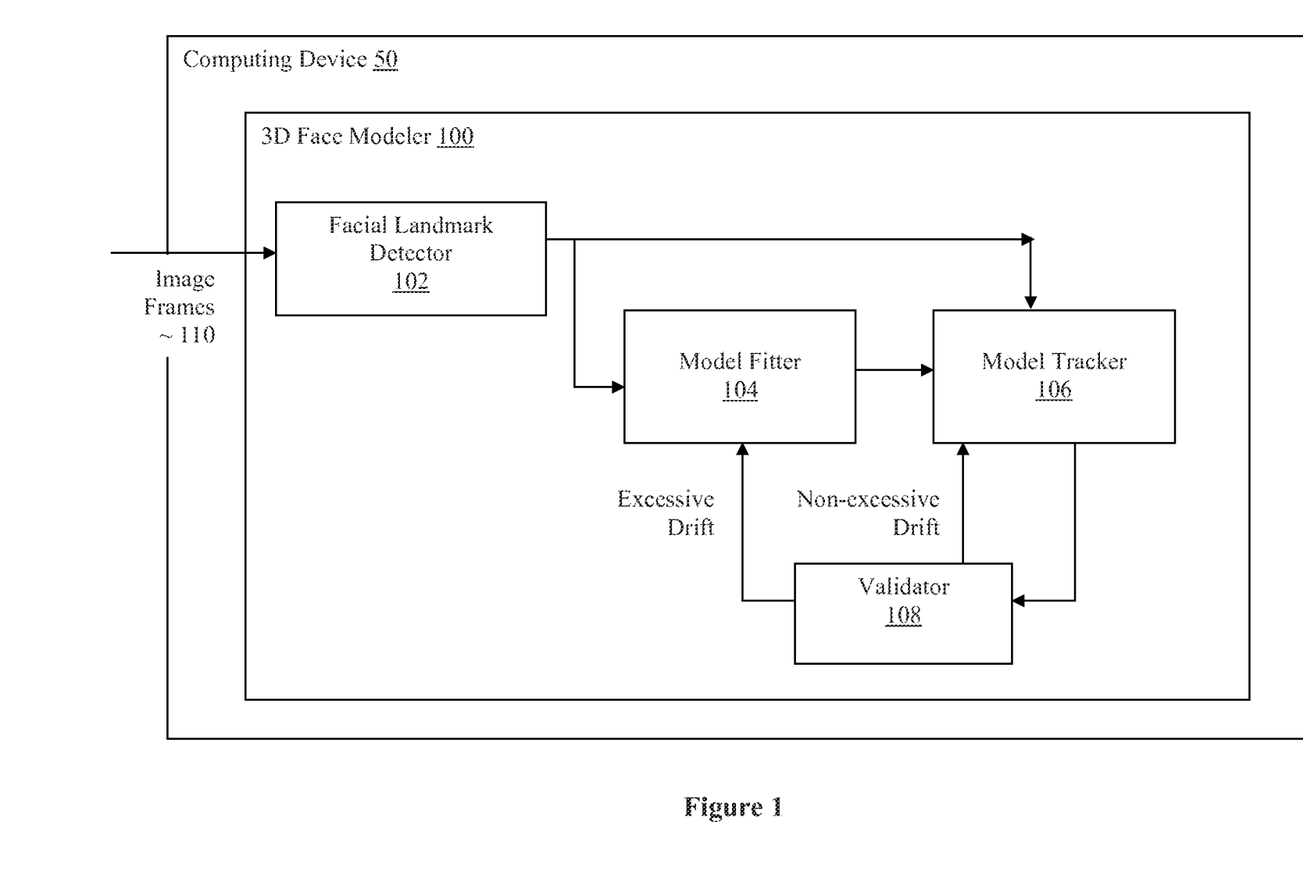
FIG. 1 is a block diagram for a computing device incorporated with the 3D face modeler of the present disclosure, according to the various embodiments.

Referring now to FIG. 1, wherein a computing device incorporated with the 3D face modeler of the present disclosure, according to the various embodiments, is shown. As illustrated, computing device 50 may include 3D face modeler 100. In embodiments, 3D face modeler 100 may include facial landmark detector 102, model fitter 104 and model tracker 106, coupled with each other. Facial landmark detector 102 may be configured to detect a plurality of landmarks of a face and their locations within each of a plurality of image frames 110. Model fitter 104 may be coupled to the facial landmark detector 102 and configured to generate or regenerate a 3D model of the face from a 3D model of a neutral face, in view of detected landmarks of the face and their locations within one of the plurality of image frames 110. Model tracker 106 may be coupled to facial landmark detector 102 and model fitter 104, and configured to adjust the 3D model generated by model fitter 104 to track the face in subsequent image frames. Model tracker 106 may successively update the 3D model in view of detected landmarks of the face and their locations within each of successive ones of the plurality of image frames 110. In embodiments, 3D face modeler 100 may further include validator 108 coupled with model tracker 106 and model fitter 104, to monitor the face tracking for excessive drifting, and cause model fitter 104 to regenerate the 3D face model when excessive drifting is detected.

Still referring to FIG. 1, in embodiments, facial landmark detector 102 may be configured to detect a sparse number of landmark positions, e.g., 30-80, in a face detected within each of the plurality of image frames 110. The sparse number of landmarks may be detected from a face rotated +/−45 degrees to +/−30 degrees. The sparse number of landmark positions of the face in each of the plurality of image frames 110 may be provided to model fitter 104 to generate/regenerate a 3D model of the face from a neutral face, and to model tracker 106 to successively maintain the 3D model of the face generated by model fitter 104. Example embodiments of facial landmark detector will be described later with references to FIG. 2. Other embodiments, beside those later described with references to FIG. 2 may also be employed instead.

In embodiments, model fitter 104 may be configured to generate or regenerate a 3D model of the face from the neutral face, by determining a 3D mesh for the face, employing a plurality of models, such as a point based facial landmark model, an ellipsoidal head model to estimate rigid motion of the face, and/or non-rigid deformable mesh model for facial shapes and expression. More specifically, in embodiments, model fitter 104 may be configured to determine a 3D for the face, through solving the following objective function:

$$\text{Minimize } E = E_{landmark} + E_{ellipsoidal} + E_{mesh} \tag{1}$$

where $E_{landmark}$ is the amount of error between a point based facial landmark model and the input facial landmark positions of an image frame;

$E_{ellipsoidal}$ is the projected pixel value differences between an ellipsoidal head model to estimate rigid motion of the face, and the image frame;

$E_{mesh}$ is the projected pixel value differences between a non-rigid deformable mesh model for facial shapes and expression, and the image frame; and E is the sum of the above three error components.

In determining the 3D mesh, model fitter 104 may estimate all model parameters from neutral shape, expression, and head pose from scratch. Model fitter 104 may consider inter-person shape variations as well as intra-person expression variations. Example embodiments of the operational flow of model fitter 104 will be later described with references to FIG. 3.

In embodiments, model tracker 106 may be similarly constituted as model fitter 104, except model tracker 106 may be configured to maintain the 3D model of the face, through adjustment of the resulting 3D model of the face of the previous image frame. Further, model tracker 106 may fix inter-person shape variations, and consider only intra-person expression variations. In other words, to further improve computational efficiency, model tracker 106 assumes it is tracking the face of the same object or person. Example embodiments of the operational flow of model tracker 106 will be later described with references to FIG. 4.

In embodiments, validator 108 may be configured to monitor the face tracking for excessive drifting through detection of whether inaccuracies (errors) of the 3D model successively adjusted by model tracker 106 has grown to exceed a threshold. While usage of previous frame's resulting 3D model as the starting 3D model of the current frame improves computational efficiency, tracking error can be accumulated as time proceeds. Although the error minimization term which is related to facial landmark detections can reduce the amount of drifting while tracking, the drifting artifact is unlikely to be completely prevented. Thus, validator 108 serves to ensure accuracy is not overly sacrificed for improvement in computational efficiency. Example embodiments of the operational flow of validator 108 will be later described with references to FIG. 5.

Before describing facial landmark detector 102, model fitter 104, model tracker 106, and validator 108 in further detail, it should be noted that 3D face modeler 100 may be implemented in hardware, software, or a combination thereof. For hardware embodiments, 3D face modeler 100 may be implemented, e.g., with application specific integrated circuits (ASIC), or programmable logic devices (PLD) programmed with the operational logic of 3D face modeler 100. For partial or entirely software embodiments, computing device 50 may further include one or more processors, and memory, and one or more of facial landmark detector 102, model fitter 104, model tracker 106, and validator 108 may be implemented in assembler/machine instructions supported by the processor or any one of a number of programming languages compilable into the assembler/machine language supported by the processors. In embodiments, computing device 50 may further include a number of peripheral devices such as display devices, input/output devices, or communication/networking devices. Except for 3D face modeler 100, computing device 50 may be any one of a number of computing devices known in the art, including but are not limited to smartphones, ultrabooks, computing tablets, laptops, desktop computers, servers, set-top boxes or game consoles. As will be appreciated, by virtue of the coordinated arrangement of the components of facial modeler 100, with its improved computational efficiency, it may be suitable even for resource constrained devices, such as mobile devices like smartphones, and/or computing tablets.

Figure 2:
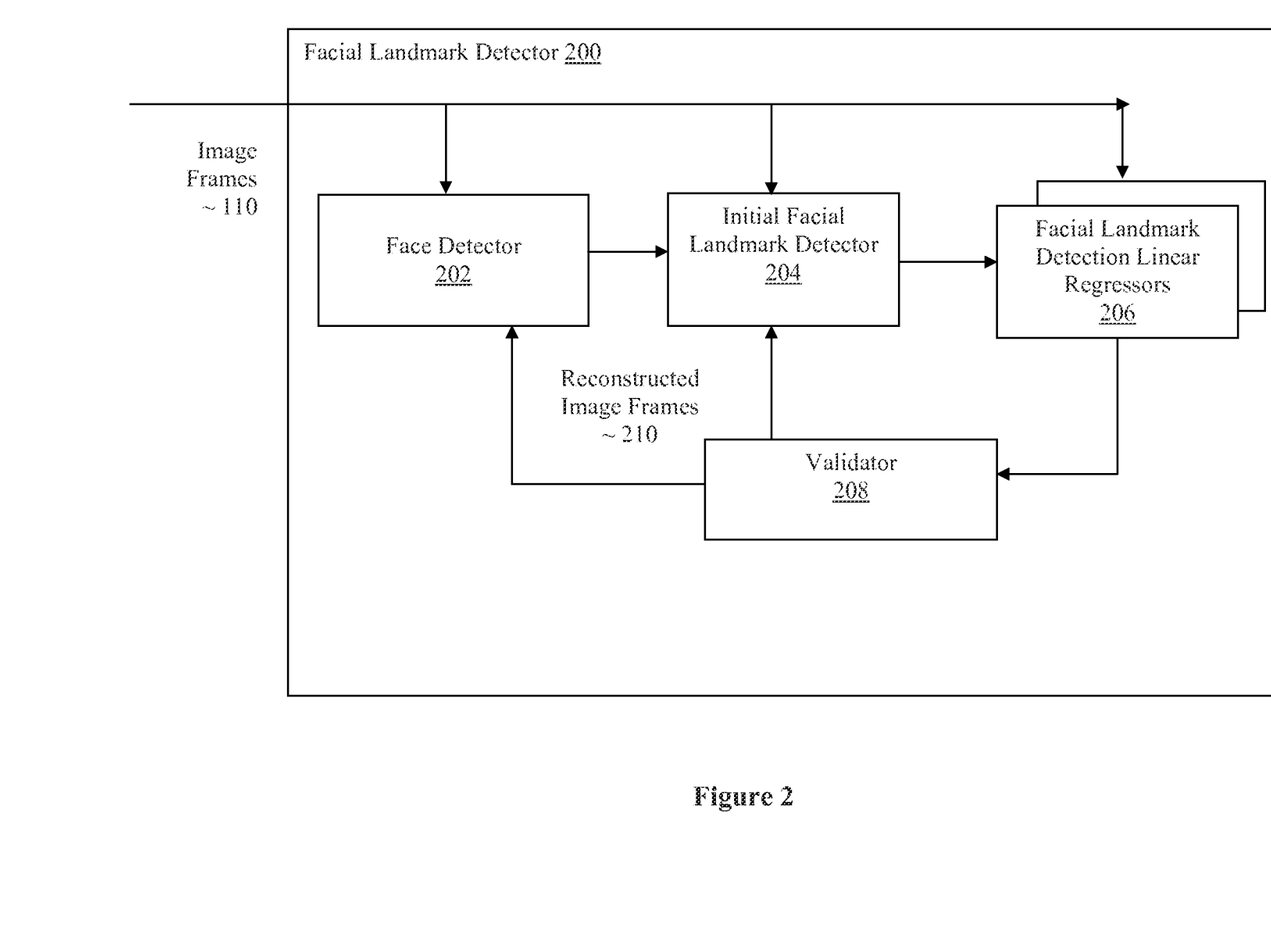
FIG. 2 illustrates an example facial landmark detector, according to the various embodiments.

Referring now to FIG. 2, wherein an example facial landmark detector, in accordance with various embodiments, is illustrated. As shown, example facial landmark detector 200 may include face detector 202, initial facial landmark detector 204, a number of facial landmarks detection linear regressors 206, and validator 208. In embodiments, detector 202, facial landmark detector 204, facial landmarks detection linear regressors 206, and validator 208 may be configured to cooperate to take a coarse-to-fine approach. In the initial stage, a rough location of a face within an image frame may be estimated, and then a sparse number of facial landmarks may be localized based on fern-based cascaded regression. Then, several consecutive regularized linear regressors may be applied to more accurately identify the locations of the facial landmarks. In embodiments, example facial landmark detector 200 may serve as facial landmark detector 102 of FIG. 1.

In embodiments, face detector 202 may be configured to identify an area, e.g., a rectangular area, of an image frame as containing a face. Face detector 202 may be configured to search several different image scales to effectively find faces of different sizes for each given image frame. Statistics such as averages and standard deviations of distances between found rectangles and actual face bounding boxes may be pre-computed with a large number of training images, and later used to compensate the difference between face rectangle and actual face region.

Initial facial landmark detector 204 may be coupled with the face detector and configured to detect, within each area identified as having a face, a number of facial landmarks of the face, including in particular, inner eye corner, and their locations. In embodiments, to enhance computational efficiency, a sparse number of facial landmarks are detected. Experience has shown that inner eye corners are highly distinguishable and robust against facial expressions and poses in human faces. These facial landmarks and their initial locations may then be used to serve as initial facial landmarks to be refined by one or more linear regressors 206. Employment of linear regressors, as opposed to non-linear regressors, enables high speed performance while avoiding data over-fitting, which in turn, enables handling of a wide range of face poses, expressions, and illumination variations.

The one or more facial landmark detection linear regressors 206 may be coupled with the face detector 202 and the initial facial landmark detector 204 and configured to iteratively refine and more accurately identify the facial landmark locations. In embodiments, four (4) linear regresssors are employed. The first linear regressor 206 may be trained with relatively large variations between input and humanly annotated ground truth data of facial landmarks in images (hereinafter simply, ground truth data) to cover initial errors of face and initial facial landmark detectors 202 and 204. The remaining linear regressors 206 may be trained with decreasing variations between input and ground truth data, with each regression iteration refines the facial landmark positions with more precision.

In embodiments, each regressor 206 may be trained to minimize total distance between current landmark positions and ground truth annotations, as well as minimize the norm of the regressor 206. Resultantly, the signal to noise ratio of the output facial landmark positions may be improved. In embodiment, the regressors 206 may be configured to work with gradient of an image frame, as opposed to intensity values of the image frame. Experience has shown working with image gradient may improve the robustness of the computation with respect to illumination changes.

In embodiments, validator 208 may be configured to reconstruct the face for the image frame from the one or more detected facial landmarks, and the image frame, and provide the reconstructed image frame to face and initial facial landmark detectors 202 and 204 again to check if face and initial facial landmark detectors 202 and 204 are able to detect whether a face and one or more eyes are present within the reconstructed image frame.

In embodiments, for computational efficiency, once confirmed, face and initial facial landmark detection may be skipped for the next frame. Instead, the facial landmark positions of the previous frame may be employed for the current frame. The process may then continue, until the validation fails. Then, the face detection and initial facial landmark detection may be performed again.

In embodiments, each of face detector 202, initial facial landmark detector 204, and regressors 206 may be pre-trained with a large number of training examples. In embodiments, each of face detector 202, initial facial landmark detector 204, and regressors 206 is trained with tens of thousands of facial images with a wide range of facial expressions and head poses.

Figure 3:
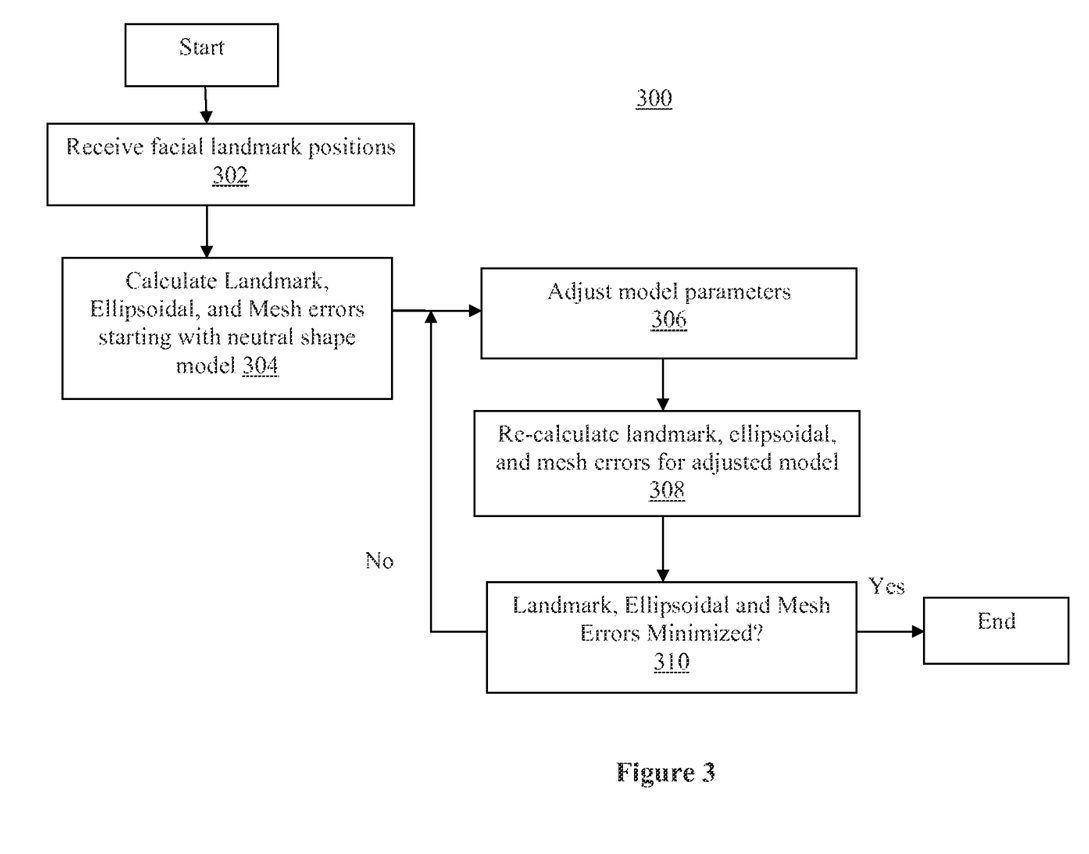
FIG. 3 illustrates an example operational flow of a model fitter, according to various embodiments.

Referring now to FIG. 3, wherein an example operational flow of a model fitter, according to various embodiments, is illustrated. As shown, example process 300 for generating an initial 3D face model from a neutral face model, based on facial landmarks identified for a face within an image frame may include operations performed in blocks 302-310. The operations may be performed e.g., by the earlier describer model fitter 104 of FIG. 1. While for ease of understanding, operations of blocks 302-310 will be described in sequence, it will be understood that in alternate embodiments, selected ones of the operations may be performed in different order.

At block 302, facial landmark positions of a face within an image frame may be received. At block 304, using a neutral face, $E_{landmark}$, an amount of error between a point based facial landmark model and the input facial landmark positions of an image frame may be calculated. Additionally, using the neutral face, $E_{ellipsoidal}$ an amount of projected pixel value differences between an ellipsoidal head model to estimate rigid motion of the face, and the image frame may also be calculate. Further, using the neutral face, $E_{mesh}$ an amount of projected pixel value differences between a non-rigid deformable mesh model for facial shapes and expression, and the image frame may likewise be calculated.

At blocks 306 and 308, the model parameters of a 3D mesh and head pose may be adjusted, and $E_{landmark}$, $E_{ellipsoidal}$ and/or $E_{mesh}$ re-calculated, in an attempt to reduce $E_{landmark}$, $E_{ellipsoidal}$ and/or $E_{mesh}$. At block 310, a determination may be made whether the improvement in reducing $E_{landmark}$, $E_{ellipsoidal}$ and/or $E_{mesh}$, is marginal, e.g., below a predetermined threshold; in other words, E, the total of $E_{landmark}$, $E_{ellipsoidal}$ and $E_{mesh}$ is effectively minimized. If E, the total of $E_{landmark}$, $E_{ellipsoidal}$ and $E_{mesh}$ has been effectively minimized, and process 300 may end, else process 300 may return to block 306 and continue therefrom as earlier described. In determining the 3D mesh, all model parameters from neutral shape, expression, and head pose may be estimated from scratch. Inter-person shape variations as well as intra-person expression variations may be considered.

Figure 4:
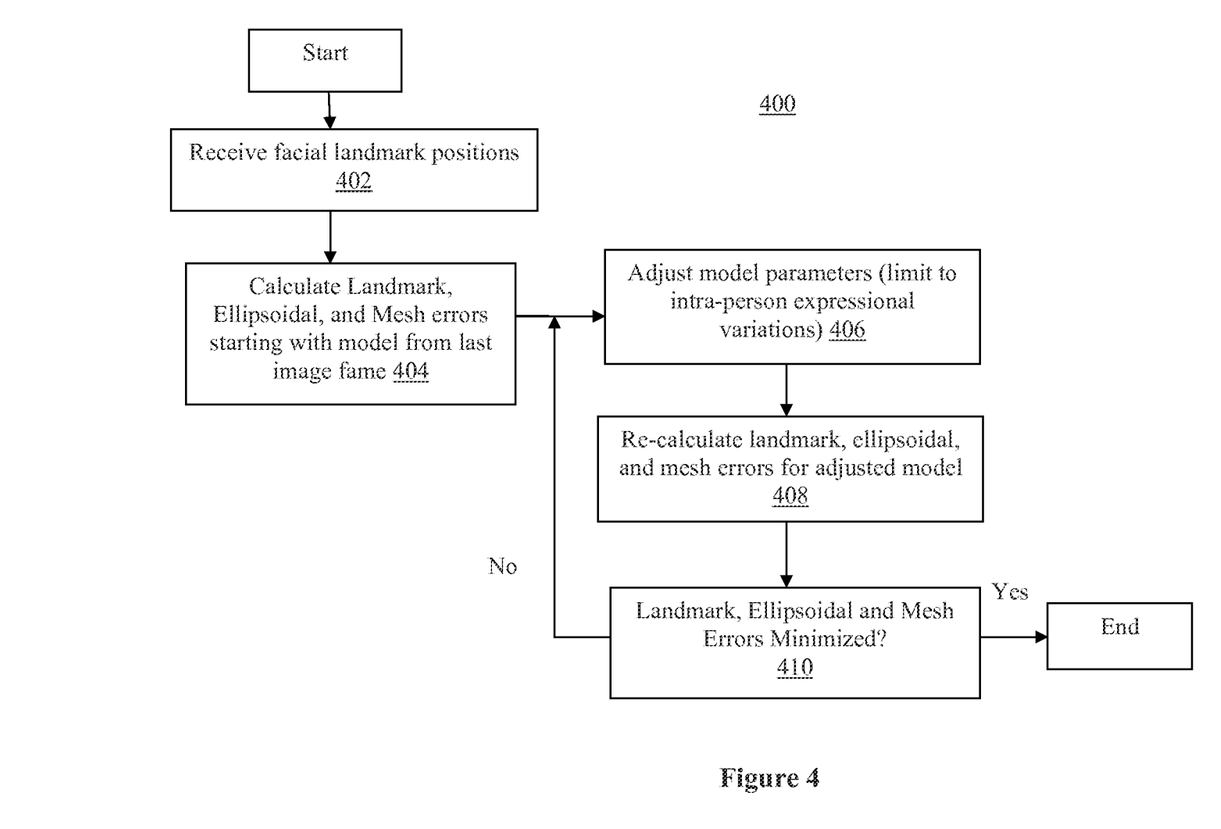
FIG. 4 illustrates an example operational flow of a model tracker, according to various embodiments

Referring now to FIG. 4, wherein an example operational flow of a model tracker, according to various embodiments, is illustrated. As shown, example process 400 for adjusting the 3D face model to track facial expression and head pose may include operations performed in blocks 402-410. The operations are similar to the operations of blocks 302-310, except the operations start with the 3D model of the last image frame, as opposed to from the neutral frame. The operations may be performed e.g., by the earlier describer model tracker 106 of FIG. 1. While for ease of understanding, operations of blocks 402-410 will be described in sequence, it will be understood that in alternate embodiments, selected ones of the operations may be performed in different order.

At block 402, facial landmark positions of a face within an image frame may be received. At block 404, using the 3D model of the last image frame, $E_{landmark}$, an amount of error between a point based facial landmark model and the input facial landmark positions of an image frame may be calculated. Additionally, using the 3D model of the last image frame, $E_{ellipsoidal}$ an amount of projected pixel value differences between an ellipsoidal head model to estimate rigid motion of the face, and the image frame may also be calculated. Further, using the 3D model of the last image frame, $E_{mesh}$ an amount of projected pixel value differences between a non-rigid deformable mesh model for facial shapes and expression, and the image frame may likewise be calculated.

At blocks 406 and 408, the model parameters of the 3D mesh and the head pose may be adjusted and $E_{landmark}$, $E_{ellipsoidal}$ and/or $E_{mesh}$ re-calculated in an attempt to reduce $E_{landmark}$, $E_{ellipsoidal}$ and/or $E_{mesh}$. At block 410, a determination may be made whether the improvement in reducing $E_{landmark}$, $E_{ellipsoidal}$ and/or $E_{mesh}$, is marginal, e.g., below a predetermined threshold; in other words, E, the total of $E_{landmark}$, $E_{ellipsoidal}$ and $E_{mesh}$ is effectively minimized. If E, the total of $E_{landmark}$, $E_{ellipsoidal}$ and $E_{mesh}$ has been effectively minimized, process 400 may end, else process 400 may return to block 406 and continue therefrom as earlier described. In determining the 3D mesh and head pose, inter-person shape variations may be fixed, with only intra-person expression variations considered.

Figure 5:
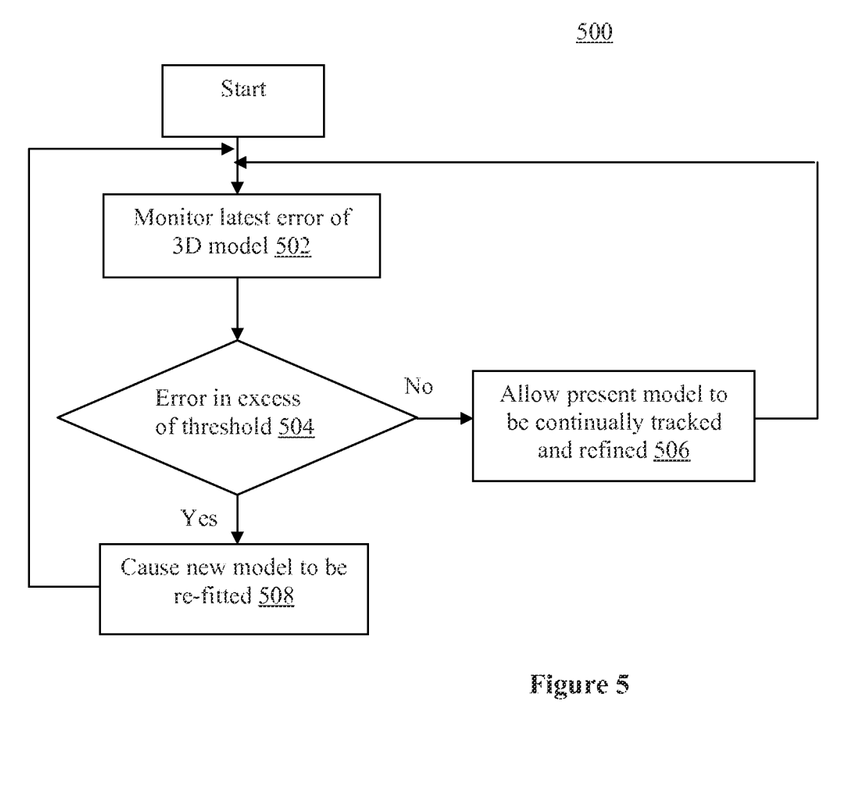
FIG. 5 illustrates an example operational flow of a validator, according to various embodiments.

Referring to FIG. 5, wherein an example operational flow of a validator, according to the various embodiments, is illustrated. As shown, example process 500 for monitoring and detecting for excessive drifting in tracking the 3D face model may include operations performed in blocks 502-508. The operations may be performed e.g., by the earlier describer validator 108 of FIG. 1. While for ease of understanding, operations of blocks 502-508 will be described in sequence, it will be understood that in alternate embodiments, selected ones of the operations may be performed in different order.

At block 502, the latest amount of error (cumulative drift effect) of the 3D model tracked may be determined. At block 504, a determination may be made as to whether the latest amount of error (cumulative drifting effect) is in excess of a pre-configured threshold. If the latest amount of error (cumulative drifting effect) is not in excess of the pre-configured threshold, at block 506, the present 3D model may be allowed to be continually tracked and refined for the next image frame. Process 500 may continue thereafter from block 502 as earlier described. On the other hand, if the latest amount of error (cumulated drifting effect) is in excess of the pre-configured threshold, at block 508, a new 3D model may be caused to be re-generated from the neutral shape for the current or next image frame.

Figure 6:
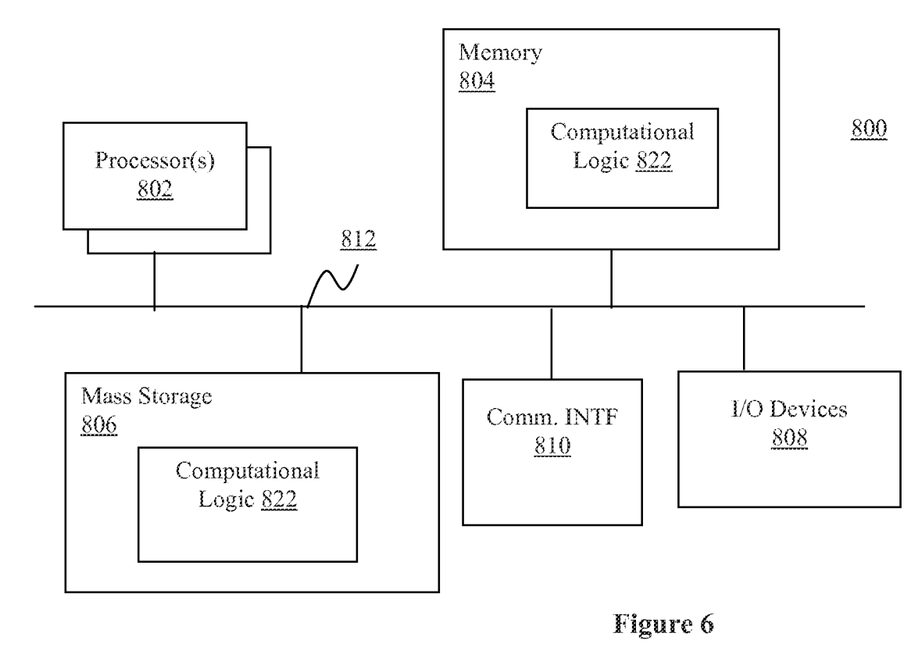
FIG. 6 illustrates an example computer system suitable for use to practice various aspects of the present disclosure, according to various embodiments.

FIG. 6 illustrates an example computer system that may be suitable for use as a client device or a server to practice selected aspects of the present disclosure. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing the operations associated with facial landmark detector 102, model fitter 104, model tracker 106, and validator 108, earlier described, collectively referred to as computational logic 822. The various elements may be implemented by assembler instructions supported by processor(s) 802 or high-level languages, such as, for example, C, that can be compiled into such instructions.

The number, capability and/or capacity of these elements 810-812 may vary, depending on whether computer 800 is used as a client device or a server. When use as client device, the capability and/or capacity of these elements 810-812 may vary, depending on whether the client device is a stationary or mobile device, like a smartphone, computing tablet, ultrabook or laptop. Otherwise, the constitutions of elements 810-812 are known, and accordingly will not be further described.

Figure 7:
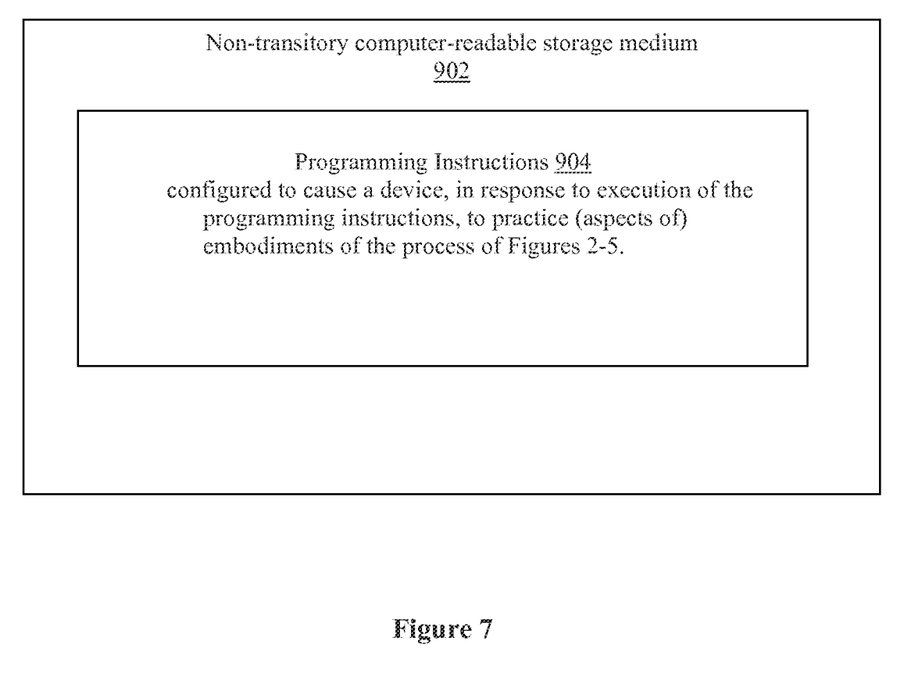
FIG. 7 illustrates a storage medium having instructions for practicing methods described with references to FIGS. 2-5, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computer 800, in response to execution of the programming instructions, to perform, e.g., various operations associated with facial landmark detector 102, model fitter 104, model tracker 106, and validator 108. In alternate embodiments, programming instructions 904 may be disposed on multiple computer-readable non-transitory storage media 902 instead. In alternate embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 802 may be packaged together with memory having computational logic 822 (in lieu of storing on memory 804 and storage 806). For one embodiment, at least one of processors 802 may be packaged together with memory having computational logic 822 to form a System in Package (SiP). For one embodiment, at least one of processors 802 may be integrated on the same die with memory having computational logic 822. For one embodiment, at least one of processors 802 may be packaged together with memory having computational logic 822 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus equipped to construct a three-dimensional, 3D, face model. The apparatus may comprise a facial landmark detector, a model fitter, and a model tracker, coupled with each other. The facial landmark detector may be configured to detect a plurality of landmarks of a face, and their locations, within each of a plurality of image frames. The model fitter may be configured to generate a 3D model of the face from a 3D model of a neutral face, in view of detected landmarks of the face and their locations within a first one of the plurality of image frames. The model tracker may be configured to adjust the 3D model to track the face in subsequent image frames, successively adjusting the 3D model in view of detected landmarks of the face and their locations within each of successive ones of the plurality of image frames.

Example 2 may be a facial landmark detector, e.g., the facial landmark detector of example 1. The facial landmark detector may include a face detector, an initial facial landmark detector, and one or more facial landmark detection linear regressors, coupled with each other. The face detector may be configured to detect a face within an image frame. The initial facial landmark detector may be configured to detect one or more landmarks, including an inner eye corner, and their locations within a detected face. The one or more facial landmark detection linear regressors may be configured to iteratively refine the facial landmark locations of the detected face with increased precision.

Example 3 may be example 2, wherein the facial landmark detector may further comprise a validator coupled with the face detector and the initial facial landmark detector, and configured to reconstruct a face from the facial landmarks, and an image frame, and provide the reconstructed image frame to the face and initial facial landmark detectors to detect whether a face and one or more eyes are present within the reconstructed image frame.

Example 4 may be example 2 or 3, wherein the one or more face landmark detection linear regressors may comprise a first face landmark detection linear regressor to refine facial landmark locations to a first precision, and a second facial landmark detection linear regressor to refine the facial landmark locations from the first precision to a second precision, wherein the second precision is more precise than the first precision.

Example 5 may be example 1 (optionally having a facial landmark detector of any one of examples 2-4,) wherein the model fitter may be configured to estimate an initial 3D mesh and head pose, in view of the detected landmarks of the face and their locations within the first image frame.

Example 6 may be example 5, wherein the model fitter may be configured to further modify the initial 3D mesh and head pose to reduce a first amount of differences between locations of the landmarks as depicted by the 3D mesh and head pose and locations of the landmarks as detected by the facial landmark detector.

Example 7 may be example 5 or 6, wherein the model fitter may be configured to further modify the initial 3D mesh and head pose to reduce a second amount of differences between locations of the landmarks as depicted by an ellipsoidal model of the face and locations of the landmarks as detected by the facial landmark detector.

Example 8 may be any one of examples 5-7, wherein the model fitter may be configured to further modify the initial 3D mesh and head pose to reduce a third amount of differences between locations of the landmarks as depicted by a deformable mesh model of the face and locations of the landmarks as detected by the facial landmark detector.

Example 9 may be example 5, wherein the model fitter may be configured to further modify the initial 3D mesh and head pose to reduce a sum of a first, a second and a third amount of differences, wherein the first amount of differences is an amount of difference between locations of the landmarks as depicted by the 3D mesh and head pose and locations of the landmarks as detected, the second amount of differences is an amount of differences between locations of the landmarks as depicted by an ellipsoidal model of the face and locations of the landmarks as detected, and the third amount of differences is an amount of differences between locations of the landmarks as depicted by a deformable mesh model of the face and locations of the landmarks as detected.

Example 10 may be any one of examples 1 and 5-9 (optionally having a facial landmark detector of any one of examples 2-4), wherein the model tracker may be configured to fix inter-person shape variations, and consider only intra-person expression variation, when successively updating the 3D model in view of detected landmarks of the face and their locations within successive ones of the plurality of image frames.

Example 11 may be any one of examples 1 and 5-9 (optionally having a facial landmark detector of any one of examples 2-4), further comprising a validator coupled with the model fitter and the model tracker to monitor the adjustment of the 3D model to track the face to detect for excessive drifting, and to cause model fitter to re-generate another 3D model of the face when excessive drifting is detected.

Example 12 may be example 11, wherein the validator may be configured to detect for excessive drifting through detection of whether inaccuracies of the 3D model successively maintained by the model tracker has grown to exceed a threshold.

Example 13 may be example 11 or 12, wherein the model fitter may be configured to re-generate another 3D model of the face from the 3D model of neutral face, in view of detected landmarks of the face and their locations within a current or next one of the plurality of image frames.

Example 14 may be a method for constructing a three-dimensional, 3D, face model. The method may comprise detecting, by a computing device, a plurality of landmarks of a face, and their locations, within each of a plurality of image frames; and generating, by the computing device, in view of detected landmarks of the face and their locations within a first one of the plurality of image frames. The method may further comprise adjusting, by the computing device, the 3D model to track the face in subsequent image frames, successively adjusting the 3D model in view of detected landmarks of the face and their locations within each of successive ones of the plurality of image frames.

Example 15 may be a method for detecting a plurality of landmarks of a face. The method may be used for the detecting operation for example 14. The method may include detecting by a computing device a face within an image frame, and detecting by a computing device one or more landmarks, including an inner eye corner, and their locations within a detected face. The method may further include iteratively refining by the computing device the facial landmark locations of the detected face with increased precision.

Example 16 may be the method of example 15, wherein detecting a plurality of landmarks of a face may further comprise reconstructing a face from the facial landmarks, and an image frame, and detecting whether a face and one or more eyes are present within the reconstructed image frame.

Example 17 may be the method of example 15 or 16, wherein iteratively refining comprises first refining facial landmark locations to a first precision, and second refining the facial landmark locations from the first precision to a second precision, wherein the second precision is more precise than the first precision.

Example 18 may be the method of example 14 (with the operation of detecting facial landmarks optionally employing any one of the methods of examples 15-17), wherein generating may comprise estimating an initial 3D mesh and head pose, in view of the detected landmarks of the face and their locations within the first image frame.

Example 19 may be the method of example 18, wherein generating may further comprise modifying the initial 3D mesh and head pose to reduce a first amount of differences between locations of the landmarks as depicted by the 3D mesh and head pose and locations of the landmarks as detected.

Example 20 may be the method of example 18 or 19, wherein generating may further comprise modifying the initial 3D mesh and head pose to reduce a second amount of differences between locations of the landmarks as depicted by an ellipsoidal model of the face and locations of the landmarks as detected.

Example 21 may be the method of any one of examples 18-20, wherein generating may further comprise modifying the initial 3D mesh and head pose to reduce a third amount of differences between locations of the landmarks as depicted by a deformable mesh model of the face and locations of the landmarks as detected.

Example 22 may be the method of example 18, wherein generating may further comprise modifying the initial 3D mesh and head pose to reduce a sum of a first, a second and a third amount of differences, wherein the first amount of differences is an amount of difference between locations of the landmarks as depicted by the 3D mesh and head pose and locations of the landmarks as detected, the second amount of differences is an amount of differences between locations of the landmarks as depicted by an ellipsoidal model of the face and locations of the landmarks as detected, and the third amount of differences is an amount of differences between locations of the landmarks as depicted by a deformable mesh model of the face and locations of the landmarks as detected.

Example 23 may be the method of example 14 (with the operation of detecting facial landmarks optionally employing any one of the methods of examples 15-17), wherein adjusting may comprise fixing inter-person shape variations, and considering only intra-person expression variation, when successively updating the 3D model in view of detected landmarks of the face and their locations within successive ones of the plurality of image frames.

Example 24 may be the method of example 14 or 23 (with the operation of detecting facial landmarks optionally employing any one of the methods of examples 15-17), further comprising monitoring the adjustment of the 3D model to track the face to detect for excessive drifting, and re-generating another 3D model of the face when excessive drifting is detected.

Example 25 may be the method of example 24, wherein monitoring may comprise detecting whether inaccuracies of the 3D model successively maintained by the model tracker has grown to exceed a threshold.

Example 26 may be the method of example 24 or 25, wherein re-generating may comprise re-generating another 3D model of the face from the 3D model of neutral face, in view of detected landmarks of the face and their locations within a current or next one of the plurality of image frames.

Example 27 may be one or more computer-readable medium having instructions to cause a computing device, in response to execution of the instructions by the computing device, to perform any one of the methods of examples 14-26.

Example 28 may be an apparatus for constructing a three-dimensional, 3D, face model. The apparatus may comprise means for detecting a plurality of landmarks of a face, and their locations, within each of a plurality of image frames; and means for generating, in view of detected landmarks of the face and their locations within a first one of the plurality of image frames. The apparatus may further comprise means for adjusting the 3D model to track the face in subsequent image frames, successively adjusting the 3D model in view of detected landmarks of the face and their locations within each of successive ones of the plurality of image frames.

Example 29 may be an apparatus for detecting a plurality of landmarks of a face. The apparatus may be used for the detecting operation for example 28. The apparatus may include means for detecting a face within an image frame, and means for detecting one or more landmarks, including an inner eye corner, and their locations within a detected face. The apparatus may further include means for iteratively refining the facial landmark locations of the detected face with increased precision.

Example 30 may be the apparatus of example 29, wherein means for detecting a plurality of landmarks of a face may further comprise means for reconstructing a face from the facial landmarks, and an image frame, and means for detecting whether a face and one or more eyes are present within the reconstructed image frame.

Example 31 may be the apparatus of example 29 or 30, wherein means for iteratively refining comprises first means for facial landmark locations to a first precision, and second means for refining the facial landmark locations from the first precision to a second precision, wherein the second precision is more precise than the first precision.

Example 32 may be the apparatus of example 28 (with means for detecting facial landmarks optionally employing any one of the apparatuses of examples 29-31), wherein means for generating may comprise means for estimating an initial 3D mesh and head pose, in view of the detected landmarks of the face and their locations within the first image frame.

Example 33 may be the apparatus of example 32, wherein means for generating may further comprise means for modifying the initial 3D mesh and head pose to reduce a first amount of differences between locations of the landmarks as depicted by the 3D mesh and head pose and locations of the landmarks as detected.

Example 34 may be the apparatus of example 32 or 33, wherein means for generating may further comprise means for modifying the initial 3D mesh and head pose to reduce a second amount of differences between locations of the landmarks as depicted by an ellipsoidal model of the face and locations of the landmarks as detected.

Example 35 may be the apparatus of any one of examples 32-34, wherein means for generating may further comprise means for modifying the initial 3D mesh and head pose to reduce a third amount of differences between locations of the landmarks as depicted by a deformable mesh model of the face and locations of the landmarks as detected.

Example 36 may be the apparatus of example 32, wherein means for generating may further comprise means for modifying the initial 3D mesh and head pose to reduce a sum of a first, a second and a third amount of differences, wherein the first amount of differences is an amount of difference between locations of the landmarks as depicted by the 3D mesh and head pose and locations of the landmarks as detected, the second amount of differences is an amount of differences between locations of the landmarks as depicted by an ellipsoidal model of the face and locations of the landmarks as detected, and the third amount of differences is an amount of differences between locations of the landmarks as depicted by a deformable mesh model of the face and locations of the landmarks as detected.

Example 37 may be the apparatus of example 36 (with means for detecting facial landmarks optionally any one of examples 29-31), wherein means for adjusting may comprise means for fixing inter-person shape variations, and means for considering only intra-person expression variation, when successively updating the 3D model in view of detected landmarks of the face and their locations within successive ones of the plurality of image frames.

Example 38 may be the apparatus of example 28 or 37 (with means for detecting facial landmarks optionally employing means of examples 29-31), further comprising means for monitoring the adjustment of the 3D model to track the face to detect for excessive drifting, and means for re-generating another 3D model of the face when excessive drifting is detected.

Example 39 may be the apparatus of example 38, wherein means for monitoring may comprise detecting whether inaccuracies of the 3D model successively maintained by the model tracker has grown to exceed a threshold.

Example 40 may be the apparatus of example 38 or 39, wherein means for re-generating may comprise means for re-generating another 3D model of the face from the 3D model of neutral face, in view of detected landmarks of the face and their locations within a current or next one of the plurality of image frames.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for constructing a three-dimensional, 3D, face model, comprising:
    detecting, by a computing device, a plurality of landmarks of a face, and their locations, within each of a plurality of image frames;
    generating, by the computing device, a 3D model of the face from a 3D model of a neutral face, in view of detected landmarks of the face and their locations within a first one of the plurality of image frames; and
    adjusting, by the computing device, the 3D model to track the face in subsequent image frames, successively adjusting the 3D model in view of detected landmarks of the face and their locations within each of successive ones of the plurality of image frames, wherein adjusting comprises fixing inter-person shape variations, and considering only intra-person expression variation, when successively updating the 3D model in view of detected landmarks of the face and their locations within successive ones of the plurality of image frames.

2. The method of claim 1, wherein detecting a plurality of landmarks of a face comprises:
    detecting the face within the plurality of image frames;
    detecting one or more landmarks, including an inner eye corner, and their locations within a first of the detected faces; and
    iteratively refining the facial landmark locations of the face from the first detected face, based on successive detected faces, to provide increased precision.

3. The method of claim 1, further comprising monitoring the adjustment of the 3D model to track the face to detect for excessive drifting, and re-generating another 3D model of the face when excessive drifting is detected.

4. An apparatus equipped to construct a three-dimensional, 3D, face model, comprising:

a facial landmark detector to detect a plurality of landmarks of a face, and their locations, within each of a plurality of image frames;

a model fitter coupled to the facial landmark detector to generate a 3D model of the face from a 3D model of a neutral face, in view of detected landmarks of the face and their locations within a first one of the plurality of image frames; and a model tracker coupled to the facial landmark detector and the model fitter to adjust the 3D model to track the face in subsequent image frames, successively adjusting the 3D model in view of detected landmarks of the face and their locations within each of successive ones of the plurality of image frames, wherein the model tracker is to fix inter-person shape variations, and consider only intra-person expression variation, when successively updating the 3D model in view of detected landmarks of the face and their locations within successive ones of the plurality of image frames.

5. The apparatus of claim 4, wherein the facial landmark detector comprises a face detector to detect the face within the plurality of image frames;

an initial facial landmark detector coupled with the face detector to detect one or more landmarks, including an inner eye corner, and their locations within a first of the detected faces;

one or more facial landmark detection linear regressors coupled with the face detector and the initial facial landmark detector to iteratively refine the facial landmark locations of the face from the first detected face, based on successive detected faces, to provide increased precision.

6. The apparatus of claim 5, wherein the facial landmark detector further comprises a validator coupled with the face detector and the initial facial landmark detector to reconstruct the face from the facial landmarks, and one of the plurality of image frames, and provide the reconstructed image frame to the face and initial facial landmark detectors to detect whether the face and one or more eyes are present within the reconstructed image frame.

7. The apparatus of claim 5, wherein the one or more facial landmark detection linear regressors comprise a first facial landmark detection linear regressor to refine facial landmark locations to a first precision, and a second facial landmark detection linear regressor to refine the facial landmark locations from the first precision to a second precision, wherein the second precision is more precise than the first precision.

8. The apparatus of claim 4, wherein the model fitter is to estimate an initial 3D mesh and head pose, in view of the detected landmarks of the face and their locations within the first image frame.

9. The apparatus of claim 8, wherein the model fitter is to further modify the initial 3D mesh and head pose to reduce a first amount of differences between locations of the landmarks as depicted by the 3D mesh and head pose and locations of the landmarks as detected by the facial landmark detector.

10. The apparatus of claim 9, wherein the model fitter is to further modify the initial 3D mesh and head pose to reduce a second amount of differences between locations of the landmarks as depicted by an ellipsoidal model of the face and locations of the landmarks as detected by the facial landmark detector.

11. The apparatus of claim 10, wherein the model fitter is to further modify the initial 3D mesh and head pose to reduce a third amount of differences between locations of the landmarks as depicted by a deformable mesh model of the face and locations of the landmarks as detected by the facial landmark detector.

12. The apparatus of claim 8, wherein the model fitter is to further modify the initial 3D mesh and head pose to reduce a sum of a first, a second and a third amount of differences, wherein the first amount of differences is an amount of difference between locations of the landmarks as depicted by the 3D mesh and head pose and locations of the landmarks as detected, the second amount of differences is an amount of differences between locations of the landmarks as depicted by an ellipsoidal model of the face and locations of the landmarks as detected, and the third amount of differences is an amount of differences between locations of the landmarks as depicted by a deformable mesh model of the face and locations of the landmarks as detected.

13. The apparatus of claim 4, further comprising a validator coupled with the model fitter and the model tracker to monitor the adjustment of the 3D model to track the face to detect for excessive drifting, and to cause the model fitter to re-generate another 3D model of the face when excessive drifting is detected.

14. The apparatus of claim 13, wherein the validator to detect for excessive drifting through detection of whether inaccuracies of the 3D model successively maintained by the model tracker have grown to exceed a threshold.

15. One or more non-transitory computer-readable medium having instructions to cause a computing device, in response to execution of the instructions by the computing device, to:

detect a plurality of landmarks of a face, and their locations, within each of a plurality of image frames;

generate a 3D model of the face from a 3D model of a neutral face in view of detected landmarks of the face and their locations within a first one of the plurality of image frames; and adjust the 3D model to track the face in subsequent image frames, including successively adjust the 3D model in view of detected landmarks of the face and their locations within each of successive ones of the plurality of image frames;

wherein to adjust comprises to fix inter-person shape variations, and to consider only intra-person expression variation, when successively updating the 3D model in view of detected landmarks of the face and their locations within successive ones of the plurality of image frames.

16. The computer-readable medium of claim 15, wherein to detect a plurality of landmarks of a face comprises:

to detect the face within the plurality of image frames;

to detect one or more landmarks, including an inner eye corner, and their locations within a first of the detected faces; and to iteratively refine the facial landmark locations of the face from the first detected face, based on successive detected faces, to provide increased precision.

17. The computer-readable medium of claim 16, wherein to detect a plurality of landmarks of the face further comprises to reconstruct a face from the facial landmarks, and one of the plurality of image frames, and detect whether the face and one or more eyes are present within the reconstructed image frame.

18. The computer-readable medium of claim 16, wherein to iteratively refine comprises to first refine facial landmark locations to a first precision, and to second refine the facial landmark locations from the first precision to a second precision, wherein the second precision is more precise than the first precision.

19. The computer-readable medium of claim 15, wherein to generate comprises to estimate an initial 3D mesh and head pose, in view of the detected landmarks of the face and their locations within the first image frame.

20. The computer-readable medium of claim 19, wherein to generate further comprises to modify the initial 3D mesh and head pose to reduce a first amount of differences between locations of the landmarks as depicted by the 3D mesh and head pose and locations of the landmarks as detected, a second amount of differences between locations of the landmarks as depicted by an ellipsoidal model of the face and locations of the landmarks as detected, or a third amount of differences between locations of the landmarks as depicted by a deformable mesh model of the face and locations of the landmarks as detected.

21. The computer-readable medium of claim 19, wherein to generate further comprises to modify the initial 3D mesh and head pose to reduce a sum of a first, a second and a third amount of differences, wherein the first amount of differences is an amount of difference between locations of the landmarks as depicted by the 3D mesh and head pose and locations of the landmarks as detected, the second amount of differences is an amount of differences between locations of the landmarks as depicted by an ellipsoidal model of the face and locations of the landmarks as detected, and the third amount of differences is an amount of differences between locations of the landmarks as depicted by a deformable mesh model of the face and locations of the landmarks as detected.

22. The computer-readable medium of claim 15, wherein the computing device is further caused to monitor the adjustment of the 3D model to track the face to detect for excessive drifting, and re-generate another 3D model of the face when excessive drifting is detected.

23. The computer-readable medium of claim 22, wherein to monitor comprises to detect whether inaccuracies of the 3D model successively maintained by a model tracker have grown to exceed a threshold.

* * * * *